(12) United States Patent
Yuan

(10) Patent No.: US 11,290,591 B2
(45) Date of Patent: Mar. 29, 2022

(54) DIALING METHOD AND MOBILE TERMINAL

(71) Applicant: VIVO MOBILE COMMUNICATION CO.,LTD., Guangdong (CN)

(72) Inventor: Guanzhi Yuan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/956,504

(22) PCT Filed: Dec. 18, 2018

(86) PCT No.: PCT/CN2018/121743
§ 371 (c)(1),
(2) Date: Jun. 19, 2020

(87) PCT Pub. No.: WO2019/120190
PCT Pub. Date: Jun. 27, 2019

(65) Prior Publication Data
US 2021/0099566 A1    Apr. 1, 2021

(30) Foreign Application Priority Data
Dec. 20, 2017 (CN) .......................... 201711382847.0

(51) Int. Cl.
*H04M 1/72466* (2021.01)
*H04M 3/02* (2006.01)

(52) U.S. Cl.
CPC ......... *H04M 1/72466* (2021.01); *H04M 3/02* (2013.01)

(58) Field of Classification Search
CPC .... H04M 1/72466; H04M 3/02; H04M 1/724; H04M 1/7243; H04M 1/72469;
(Continued)

(56) References Cited

U.S. PATENT DOCUMENTS 5,815,142 A    9/1998    Allard et al.
2010/0251093 A1    9/2010    Broman et al.
(Continued)

FOREIGN PATENT DOCUMENTS

CN    103248762 A    8/2013
CN    103857069 A    6/2014
(Continued)

OTHER PUBLICATIONS

Bier, Eric A., Edward W. Ishak, and Ed Chi. "Entity quick click: rapid text copying based on automatic entity extraction." CHI'06 Extended Abstracts on Human Factors in Computing Systems. 2006. (Year: 2006).*

(Continued)

*Primary Examiner* — Sharad Rampuria
(74) *Attorney, Agent, or Firm* — Maschoff Brennan

(57) ABSTRACT

A dialing method and a mobile terminal are provided. The dialing method includes: receiving a first input by a user; displaying a preset dialing control area in response to the first input, and displaying a pre-copied first phone number in a phone number input area of the dialing control area; receiving a second input by the user on the dialing control area; and dialing the first phone number in response to the second input.

15 Claims, 13 Drawing Sheets

(58) Field of Classification Search
CPC ......... H04M 2250/66; H04M 2250/22; H04M 1/56; H04M 2250/12; H04M 1/72454; H04M 1/27; H04M 1/72484; H04M 1/0214; H04M 1/72403; G06F 3/017; G06F 3/04883; G06F 3/04847
See application file for complete search history.

(56) References Cited

U.S. PATENT DOCUMENTS

| | | |
|---|---|---|
| 2015/0215446 A1 | 7/2015 | Fujimoto |
| 2016/0062613 A1* | 3/2016 | Lee ................ G06F 3/04883 715/768 |
| 2016/0127542 A1 | 5/2016 | Kim et al. |

FOREIGN PATENT DOCUMENTS

| | | |
|---|---|---|
| CN | 104253905 A | 12/2014 |
| CN | 104980576 A | 10/2015 |
| CN | 105100420 A | 11/2015 |
| CN | 105373326 A | 3/2016 |
| CN | 105933492 A | 9/2016 |
| CN | 106534445 A | 3/2017 |
| CN | 106713625 A | 5/2017 |
| CN | 1080937137 A | 5/2018 |
| EP | 2 400 731 A2 | 12/2011 |
| EP | 3 247 092 A1 | 11/2017 |

OTHER PUBLICATIONS

Mulliner, Collin. "Vulnerability analysis and attacks on NFC-enabled mobile phones." 2009 International Conference on Availability, Reliability and Security. IEEE, 2009. (Year: 2009).*

CN Office Action in Application No. 201711382847.0 dated Jul. 29, 2020.

CN Search Report in Application No. 201711382847.0 dated Nov. 15, 2018.

Written Opinion and International Search Report in Application No. PCT/CN2018/121743 dated Jul. 2, 2020.

EP Search Report in Application No. 18892282.7 dated Dec. 17, 2020.

* cited by examiner

DIALING METHOD AND MOBILE TERMINAL

CROSS-REFERENCE TO RELATED APPLICATION

The present application is the U.S. national phase of PCT Application No. PCT/CN2018/121743 filed on Dec. 18, 2018, which claims a priority of the Chinese patent application No. 201711382847.0 filed on Dec. 20, 2017, which is incorporated herein by reference in its entirety.

TECHNICAL FIELD

The present disclosure relates to the field of communication technology, in particular to a dialing method and a mobile terminal.

BACKGROUND

In the related art, a mobile terminal may dialing by dialing a phone number of a stored contact person, or dialing by manually inputting a phone number. There are scenarios during daily life that the phones numbers sent by others are received or the phone numbers are searched on the internet, and these phone numbers need to be dialed. For example, a user found a certain phone number in a webpage and needs to dial the phone number, the user needs to manually record the phone number, then switches the webpage interface to a system desktop, then re-enters a dialing interface, and manually inputs the phone number through an input keyboard of the dialing interface for dialing.

Therefore, the mobile terminal in the related art has the problem that the dialing operation is complicated.

SUMMARY

In a first aspect, an embodiment of the present disclosure provides a dialing method, including:
receiving a first input by a user;
displaying a preset dialing control area in response to the first input, and displaying a pre-copied first phone number in a phone number input area of the dialing control area;
receiving a second input by the user on the dialing control area; and
dialing the first phone number in response to the second input.

In a second aspect, an embodiment of the present disclosure further provides a mobile terminal, including:
a first receiving module, configured to receive a first input by a user;
a first display module, configured to display a preset dialing control area in response to the first input received by the first receiving module, and display a pre-copied first phone number in a phone number input area of the dialing control area;
a second receiving module, configured to receive a second input by the user on the dialing control area displayed by the first display module; and
a first dialing module, configured to dial the first phone number in response to the second input received by the second receiving module.

In a third aspect, an embodiment of the present disclosure further provides a mobile terminal, including: a memory, a processor and a computer program stored on the memory and executable on the processor, so as to implement the steps in the dialing method as described above.

In a fourth aspect, the disclosed embodiments also provide a computer readable storage medium storing computer program thereon, the computer program is executed by a processor to implement the steps in the dialing method as described above.

BRIEF DESCRIPTION OF THE DRAWINGS

In order to more clearly describe the technical solutions of embodiments of the present disclosure or the related art, the drawings used in the description or the related art will be briefly introduced below. Obviously, the drawings in the following description are merely some embodiments. For a person skilled in the art, other drawings can be obtained based on these drawings without creative work.

FIG. 1-1 is a first schematic diagram showing a display interface of the mobile terminal according to some embodiments of the present disclosure;

FIG. 1-2 is a second schematic diagram showing a display interface of the mobile terminal according to some embodiments of the present disclosure;

FIG. 1-3 is a third schematic diagram showing a display interface of the mobile terminal according to some embodiments of the present disclosure;

FIG. 1-4 is a fourth schematic diagram showing a display interface of the mobile terminal according to some embodiments of the present disclosure;

FIG. 1-5 is a fifth-schematic diagram showing a display interface of the mobile terminal according to some embodiments of the present disclosure;

FIG. 1-6 is a sixth schematic diagram showing a display interface of the mobile terminal according to some embodiments of the present disclosure;

FIG. 1-7 is a seventh schematic diagram showing a display interface of the mobile terminal according to some embodiments of the present disclosure;

FIG. 2 is a first structural diagram of a mobile terminal according to some embodiments of the present disclosure;

FIG. 3 is a block diagram of a second receiving module in the mobile terminal according to some embodiments of the present disclosure;

FIG. 4 is a second diagram of a mobile terminal according to some embodiments of the present disclosure;

FIG. 5 is a third structural diagram of a mobile terminal according to some embodiments of the present disclosure;

FIG. 6 is a fourth structural diagram of a mobile terminal according to some embodiments of the present disclosure;

FIG. 7 is a fifth structural diagram of a mobile terminal according to some embodiments of the present disclosure.

DETAILED DESCRIPTION

In the following, the technical solutions in the embodiments of the present disclosure will be clearly and completely described with reference to the drawings. Obviously, the described embodiments are part of embodiments of the present disclosure, but not all of them. Based on the embodiments of the present disclosure, all other embodiments obtained by a person skilled in the art without creative work shall fall within the protection scope of the present disclosure.

Figure 1:
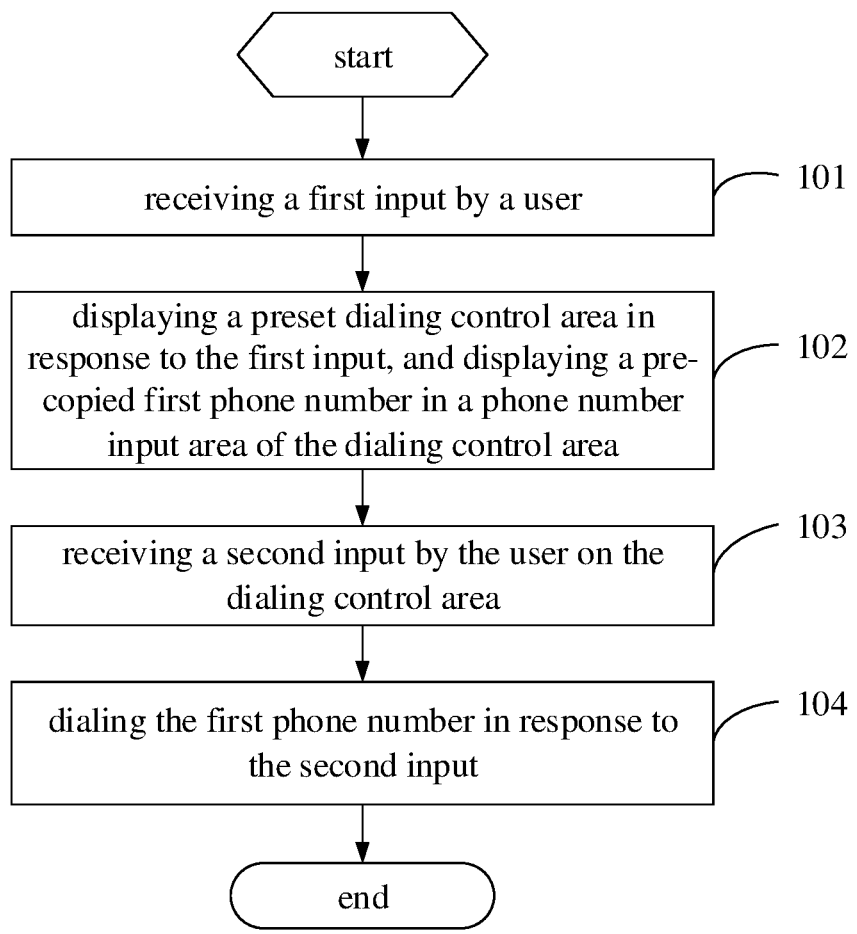
FIG. 1 is a flowchart of a dialing method according to some embodiments of the present disclosure.
Figure 1:
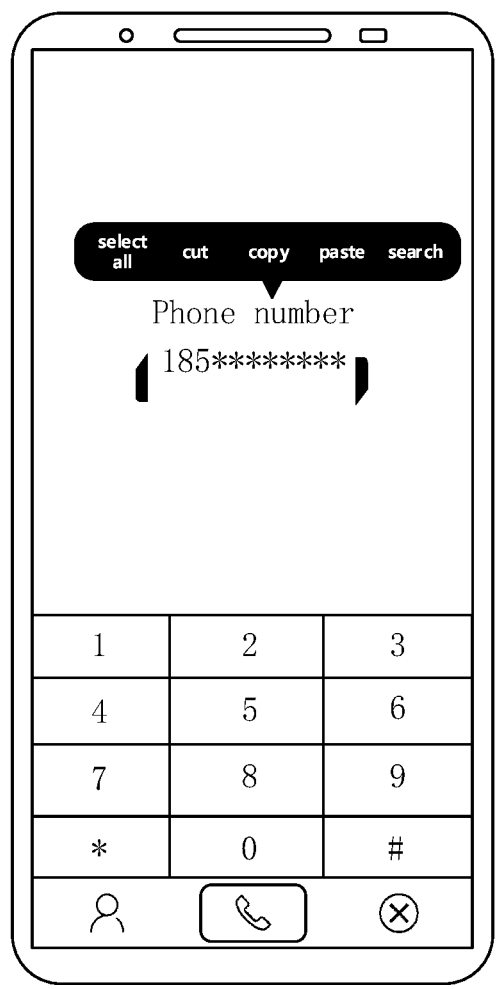

Referring to FIG. 1, FIG. 1 is a flowchart of a dialing method according to some embodiments of the present disclosure, which includes the following steps.

Step 101, receiving a first input by a user.

The first input may be an input by a user on any display interface of the mobile terminal, and the display interface may specifically be a display interface of an application program, for example, a webpage interface, a display interface of a social application program, and the like. In addition, the display interface can also be a display desktop of the mobile terminal.

The user may perform a first input within any of the display interfaces, including a click, slide, or press input.

Specifically, this step may include the following implementations.

Implementation 1 includes receiving a first dragging input by the user on a first phone number in a current display interface.

The current display interface may be an interface including a phone number, for example, a webpage interface on which a phone number is displayed, a document display interface including a phone number, or a conversation interface including a phone number.

The user may perform a dragging input, i.e., a first dragging input, on the first phone number displayed in the current display interface. Specifically, the first dragging input may be performed by moving a finger while pressing the first phone number.

Implementation 2 includes receiving a second dragging input by the user on the first preset identifier in the current display interface.

The current display interface may be any interface including the first preset identifier, for example, the current display interface may be a dialing interface of the mobile terminal, and the first preset identifier may be a dialing icon; the current display interface may be a display interface of a social application, and the first preset icon may be any icon displayed within the display interface of the social application.

When the first preset identifier is displayed in the display interface, the user can perform the dragging input on the first preset identifier, i.e. a second dragging input. During the specific operation, the user can press the first preset identifier and then move the first preset identifier.

Implementation 3 includes receiving a shaking input by the user to the mobile terminal.

In this step, the user may perform input by shaking the mobile terminal, and the mobile terminal may detect the spatial gesture of the mobile terminal. The shaking input may be specifically input by a user by shaking the mobile terminal in any plane or in a three-dimensional space.

Step 102, displaying a preset dialing control area in response to the first input, and displaying a pre-copied first phone number in a phone number input area of the dialing control area.

The dialing control area is understood to be an area for dialing, on which a user can enter a phone number for dialing. Specifically, the mobile terminal may switch an arbitrary display interface to an interface including the dialing control area, acquire a phone number previously copied on a clipboard, that is, the first phone number, and copy the phone number from the clipboard into the phone number input area of the dialing control area.

When the first input is the first dragging input by the user on the first phone number in the current display interface, specifically, under the condition that a finger of the user for the first dragging input is released, a preset dialing control area is displayed, and the first phone number is displayed in the phone number input area of the dialing control area.

In this step, the mobile terminal displays the dialing control area on a screen during the dragging input by the user on the first phone number. Along with the progress of the dragging input by the user, when the first phone number is dragged into the dialing control area, the user can release the finger at any position of the dialing control area, and when the mobile terminal detects that the user releases the finger, the phone number is pasted into the phone number input area of the dialing control area and the phone number, namely the first phone number, is displayed. The mobile terminal can determine that the finger of the user is released by detecting the touch pressure value of the finger of the user on the screen of the mobile terminal or the current change value of the mobile terminal.

Figures 1, 2:
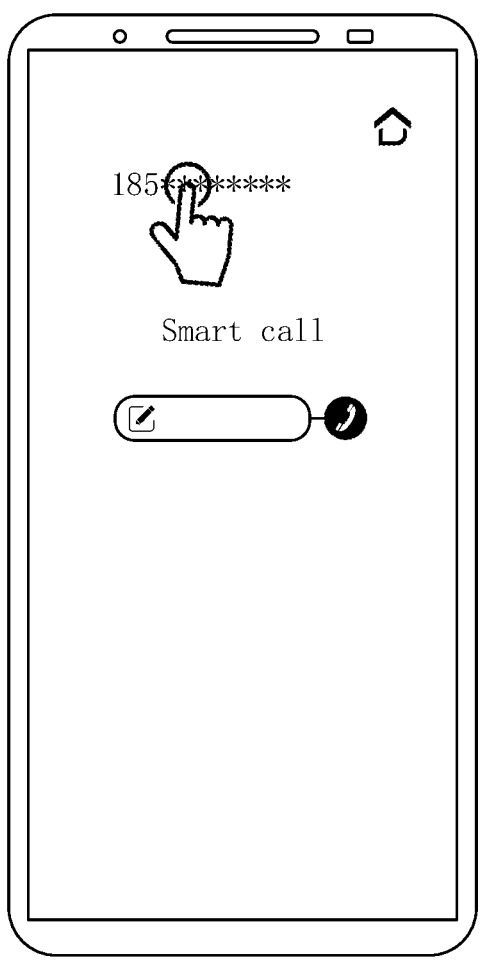

As shown in FIG. 1-1, the user may perform the dragging input on a phone number of a display interface, and the mobile terminal receives the dragging input and then automatically discern the character string of the phone number and pitches on characters of the phone number. With the progress of the dragging input, the mobile terminal switches the current display interface to a dialing interface, and the dialing interface includes a dialing control area, as shown in FIG. 1-2. The dialing control area may include a phone number entry area and dialing keys. When the phone number is on the interface of the dialing control area, and if the user's finger is released, the mobile terminal automatically pastes the phone number to the phone number input area of the dialing control area and displays the phone number.

In this way, the user can display the dialing control area in any interface, thereby quickly dialing within the dialing control area. The operation mode is convenient and fast, and the dialing efficiency is improved.

When the first input is a second dragging input by the user on a first preset identifier in the current display interface, specifically, under the condition that the dragging end position of the second dragging input is located in a preset area, a preset dialing control area is displayed, and a pre-copied first phone number is displayed in the phone number input area of the dialing control area.

The dragging end position of the second dragging input may be understood as a position in the screen when the user releases the finger during performing the dragging input. When the position is in a preset area in the current display interface, the mobile terminal displays the dialing control area in the screen. The preset area can be any position in a current display interface preset by the mobile terminal.

The mobile terminal can also detect the dragging track between the starting position and the end position of the dragging input, and when the dragging track meets a preset condition, the dialing control area is displayed. For example, when the length of the dragging track is greater than a preset length, the dialing control area is displayed.

Figures 1, 2, 3:
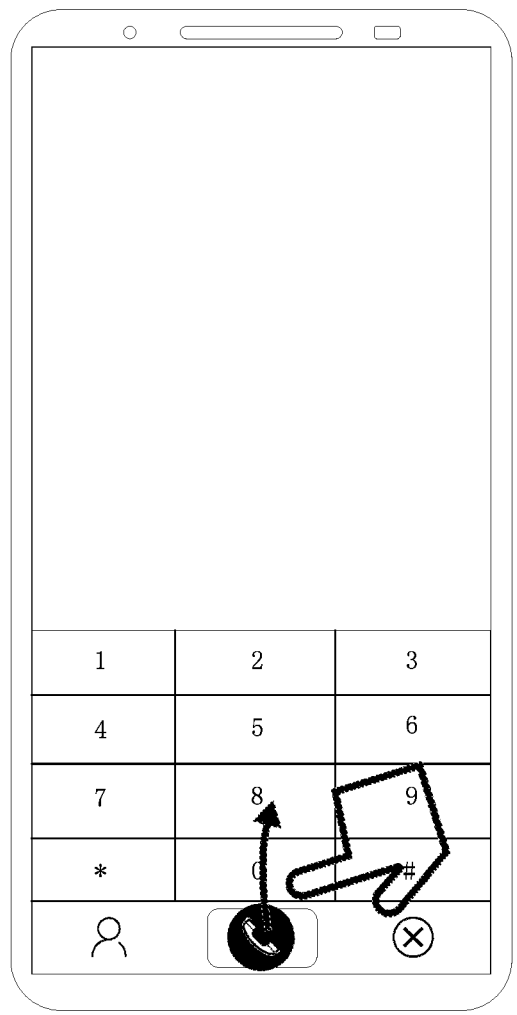

As shown in FIG. 1-3, the current display interface of the mobile terminal is a dialing interface, and the user may perform a second dragging input on the dialing button. Specifically, after the user presses the dialing button, the mobile terminal displays a circular dialing icon, the current dialing interface is displayed in gray, and the keyboard is in an inoperable state. At this time, the mobile terminal floats the circular dialing icon, the user slides the icon upward, and the mobile terminal displays the dialing control area.

In a specific implementation, the mobile terminal can switch the current display interface to a display interface containing the dialing control area, or can add the dialing control area into the current display interface, so that the user dials in the dialing control area. The user can call out the dialing control area by dragging the preset identifier to the preset area, the operation is convenient and fast, and the dialing can be quickly performed.

When the first input is shaking input by the user to the mobile terminal, specifically, under the condition that the times and the frequency of the shaking input are matched with a first preset shaking parameter, a preset dialing control area is displayed, and a pre-copied first phone number is displayed in the phone number input area of the dialing control area.

Prior to this step, the mobile terminal may preset a first preset shaking parameter that triggers the display of the dialing control area, the first preset shaking parameter may include the times and the frequency of the shaking input.

In this embodiment, the mobile terminal may detect a change amplitude of the spatial gesture of the mobile terminal, and when the change amplitude is greater than a preset amplitude, the mobile terminal receives a shaking input. At this time, the mobile terminal may continue to detect the times and the frequency of the shaking input.

The times and the frequency of the shaking input are matched with the first preset shaking parameter, it means that the times of the shaking input is matched with the preset times in the first preset shaking parameter, namely the shaking times reaches the preset times; and the frequency of the shaking input is matched with a preset frequency in the first preset shaking parameter, namely the frequency of the shaking input reaches the preset frequency value.

For example, the preset shaking times in the first preset shaking parameter is 3, and the preset shaking frequency is 2 per second. When the shaking times of the shaking input by the user reaches 3 and the shaking frequency reaches 2 per second, the mobile terminal displays the dialing control area and displays a first phone number in the phone number input area of the display control area.

Thus, the dialing control area may be quickly displayed in current display interface and perform the dialing, the user only need can call out the dialing control area through shaking, and the operation is simple and convenient.

Optionally, after displaying the preset dialing control area in response to the first input, and displaying a pre-copied first phone number in the phone number input area of the dialing control area, the method further includes: receiving a second sliding input by the user in the phone number input area; acquiring a sliding track of the second sliding input; and sequentially deleting at least one digit in the first phone number from the phone number input area based on the sliding track of the second sliding input.

In this embodiment, after the mobile terminal displays the first phone number in the phone number input area, the user may perform a second sliding input in the phone number input area, thereby deleting the phone number in the phone number input area. Specifically, when the user performs a sliding input in the phone number input area, i.e., the second sliding input, the mobile terminal may acquire a slide track of the sliding input, and delete the digits of the phone number crossed by the slide track.

For example, as shown in FIG. 1-4, after the mobile terminal displays the first phone number in the phone number input area, the user's finger slides from right to left in the phone number input area with the right end of the phone number input area as the starting point, and the mobile terminal deletes the digits of the phone number crossed by the sliding track. Therefore, when the user does not need to operate the phone number or the user needs to modify the phone number, part of or all digits in the first phone number can be deleted quickly, and the operation is convenient and fast.

In addition, when the user needs to paste the phone number into a phone number input box, the user may perform a sliding input, so as to paste the digits in the phone number into the phone number input box one by one. For example, when the user's finger slides from left to right in the phone number input box, the mobile terminal pastes the digits in the phone number pre-copied one by one at the position where the sliding track passes, and the operation is convenient and fast.

Optionally, after dialing the first phone number in response to the second input, the method further includes: receiving a third input by the user; and displaying the dialing control area as a third preset identifier in response to the third input.

The third input may be a shaking input by the user to the mobile terminal, or a pressing input or other inputs by the user on the display interface of the mobile terminal. After receiving the third input by the user, the mobile terminal may switch the dialing control area to other display interface, and display a third preset identifier in the other display interface, for example, the identifier shown in FIG. 1-7 is displayed in the display interface.

If the user needs to use the dialing control area again, the third original identifier maybe displayed as the dialing control area through three times of shaking input or a preset gesture input, the user can continue to operate on the dialing control area. Optionally, when the third original identifier is displayed as the dialing control area, a phone number which is pasted finally before switching to the third preset identifier is displayed in the phone number input area, and the user can dialing the first phone number again or delete the phone number in the phone number input box of the dialing control area. The dialing control area is displayed in minimized way by displaying the dialing control area as a third preset identifier so as not to influence the operation of a user. The user needs to call out the dialing control area again, so that the operation is convenient.

Therefore, after dialing the phone number, the user can conveniently select to continue to dialing or exit the dialing interface, and the operation is convenient and fast.

Step 103, receiving a second input by the user on the dialing control area.

The dialing control area may further include a dialing key, and the user may perform a second input on the dialing key in the dialing control area, where the input may specifically be a click input, a slide input, or the like.

When the mobile terminal supports a first user identification card and a second user identification card, the step includes receiving a first sliding input by a user on the dialing control area; acquiring a sliding direction of the first sliding input; and determining a target user identification card in the first user identification card and the second user identification card based on the sliding direction.

In this embodiment, when the mobile terminal supports the first subscriber identification card and the second subscriber identification card, the user may perform a sliding operation within the dialing control area, thereby selecting different subscriber identification cards for dialing.

Before this step, the mobile terminal may previously store a correspondence relationship between the sliding direction of the sliding input and the user identification card. When the user performs sliding input in the dialing control area, the sliding direction of the sliding input can be acquired, and the user identification card corresponding to the sliding direction is determined, so that dialing is performed through the user identification card.

For example, as shown in FIG. 1-5, a user may perform a sliding input on a dialing button in a dialing control area, and when the sliding direction is upward, the mobile terminal dials through the first user identification card; when the sliding direction is downward, the mobile terminal dials through the second user identification card. In specific implementation, when the sliding direction is in an angle range of 0-180 degree, the mobile terminal can dial through the first user identification card; and when the sliding direction is in the angle range of 181-360 degree, the mobile terminal can dial through the second user identification card. Therefore, the user can select different user identification cards for dialing by controlling the sliding direction of the sliding input, and the operation mode is simple and convenient.

Step 104, dialing the first phone number in response to the second input.

In this step, the mobile terminal calls the mobile terminal corresponding to the first phone number.

When the mobile terminal supports a first user identification card and a second user identification card, the first phone number is dialed through the target user identification card. Therefore, different user identification cards can be quickly selected through sliding operation in different directions, and the dialing efficiency can be improved.

Optionally, the dialing control area includes a second preset identifier; after the dialing the first phone number, the method further includes: receiving a fourth input by the user on the second preset identifier; replacing the first phone number in the phone number input area with a pre-copied second phone number in response to the fourth input; and dialing the second phone number.

The second preset identifier may be an identifier located at any position in the dialing control area. In this embodiment, the mobile terminal may perform a fourth input on the second preset identifier of the dialing control area, the fourth input may specifically be a click input, a slide input, a press input, or the like. The mobile terminal pastes a second phone number previously copied at the clipboard to the phone number input area in response to the fourth input. Through a plurality of operations on the second preset identifier, the plurality of phone numbers can be quickly pasted and dialed.

For example, as shown in FIG. 1-6, the user performs a click input to an identifier of "smart call" displayed in the dialing control area, and the mobile terminal replaces the first phone number in the phone number input area with the second phone number in response to the click input. When each click input by the user on the identifier of the "smart call" is detected, the phone number to be pasted at present automatically covers the phone number pasted at the last time, and the operation is convenient.

The second phone number may be any phone number previously copied to the clipboard. In a specific implementation, the second phone number may be determined in chronological order of being pasted to the clipboard. For example, the first phone number is a phone number that was pasted to the clipboard at the latest, and the second phone number may be a phone number that was pasted at the latest on the clipboard in addition to the first phone number. Therefore, when a plurality of phone numbers need to be dialed, the plurality of phone numbers can be copied to the clipboard at the same time, so that a user can dial the copied phone numbers one by one, and the dialing efficiency can be improved.

In the embodiment of the present disclosure, the dialing method may be applied to a mobile terminal having a communication function, for example: a Mobile phone, a Tablet Personal Computer, a Laptop Computer, a Personal Digital Assistant (PDA), a Mobile Internet Device (MID), a Wearable Device, or the like.

The dialing method of the embodiment of the disclosure includes receiving a first input by a user; displaying a preset dialing control area in response to the first input, and displaying a pre-copied first phone number in a phone number input area of the dialing control area; receiving a second input by the user on the dialing control area; dialing the first phone number in response to the second input. Therefore, when the mobile terminal displays any interface, the any interface can be displayed as the dialing control area, so that dialing is performed in the dialing control area, the operation is convenient, and the dialing efficiency can be improved.

Referring to FIG. 2, which is a block diagram of a mobile terminal according to an embodiment of the present disclosure, and as shown in FIG. 2, the mobile terminal 200 includes: a first receiving module 201, a first display module 202, a second receiving module 203 and a first dialing module 204. The first receiving module 201 is connected with the first display module 202, the first display module 202 is connected with the second receiving module 203, and the second receiving module 203 is connected with the first dialing module 204.

The first receiving module 201 is configured to receive a first input by a user. The first display module 202 is configured to display a preset dialing control area in response to the first input received by the first receiving module 201, and display a pre-copied first phone number in a phone number input area of the dialing control area. The second receiving module 203 is configured to receive a second input by the user on the dialing control area displayed by the first display module 202. The first dialing module 204 is configured to dial the first phone number in response to the second input received by the second receiving module 203.

Optionally, the first receiving module 201 is specifically configured to receive a first dragging input by a user on a first phone number in a current display interface. The first display module 202 is specifically configured to, in a case that the finger of the user performing the first dragging input is released, display a preset dialing control area, and display the first phone number in the phone number input area of the dialing control area.

Optionally, the first receiving module 201 is specifically configured to receive a second dragging input by the user on the first preset identifier in the current display interface. The first display module 202 is specifically configured to, when the dragging end position of the second dragging input is located in a preset area, display a preset dialing control area, and display a pre-copied first phone number in the phone number input area of the dialing control area.

Optionally, the first receiving module 201 is specifically configured to receive a shaking input by a user to the mobile terminal. The first display module 202 is specifically configured to, in a case that the times and the frequency of the shaking input are matched with a first preset shaking parameter, display a preset dialing control area, and display the pre-copied first phone number in the phone number input area of the dialing control area.

Optionally, as shown in FIG. 3, the mobile terminal supports a first user identification card and a second user identification card. The second receiving module 203 includes: a receiving sub-module 2031 configured to receive a first sliding input by a user on the dialing control area; an acquiring sub-module 2032, configured to acquire a sliding direction of the first sliding input received by the receiving sub-module 2031; a determining sub-module 2033 configured to determine a target user identification module card from the first user identification card and the second user identification card based on the sliding direction acquired by the acquiring sub-module 2032. The first dialing module 204 is specifically configured to dial the first phone number through the target user identification card.

Figures 1, 2, 3, 4:
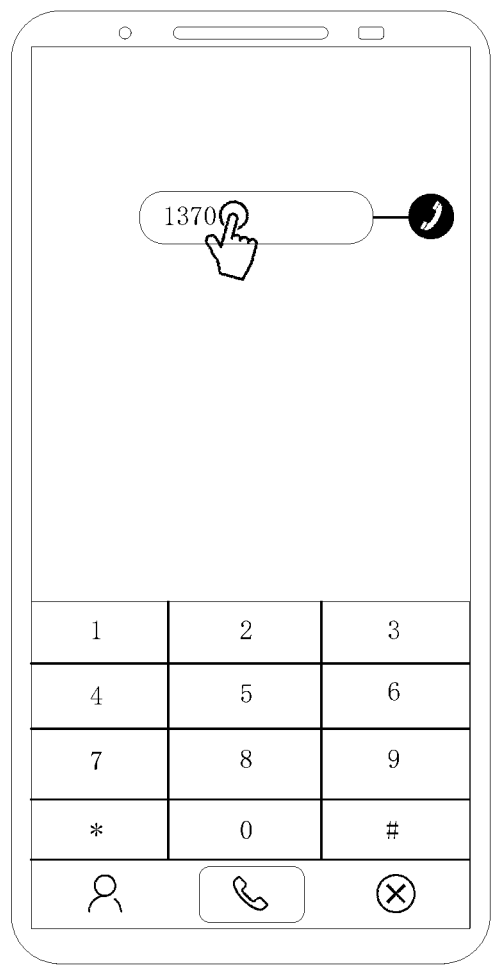

Optionally, as shown in FIG. 4, the dialing control area includes a second preset identifier. The mobile terminal 200 further includes: a third receiving module 205, configured to receive a fourth input by the user on the second preset identifier; a replacing module 206, configured to replace the first phone number in the phone number input area with a pre-copied second phone number in response to the fourth input received by the third receiving module 205; a second dialing module 207, configured to dial the second phone number replaced by the replacing module 206.

Figures 1, 2, 3, 4, 5:
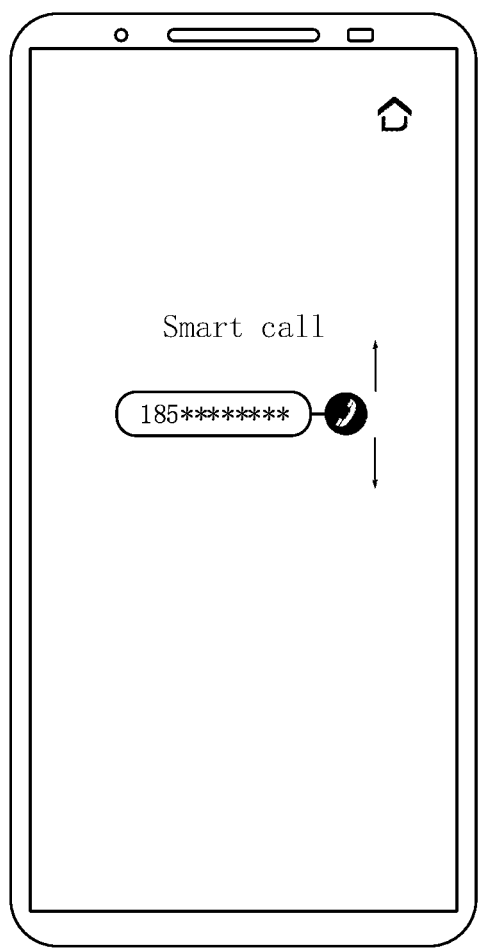

Optionally, as shown in FIG. 5, the mobile terminal 200 further includes: a fourth receiving module 208, configured to receive a second sliding input by the user in the number input area; an acquiring module 209, configured to acquire a sliding track of the second sliding input received by the fourth receiving module 208; a deleting module 210, configured to delete at least one digit in the first phone number from the phone number input area in sequence based on the sliding track of the second sliding input acquired by the acquiring module 209.

Figures 1, 2, 3, 4, 5, 6:
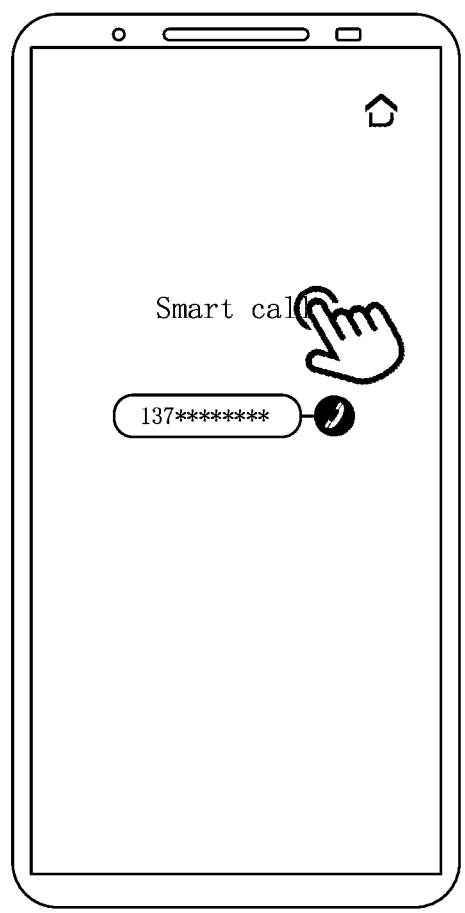

Optionally, as shown in FIG. 6, the mobile terminal 200 further includes: a fifth receiving module 211, configured to receive a third input by the user; a second display module 212, configured to display the dialing control area as a third preset identifier in response to the third input received by the fifth receiving module 211.

The mobile terminal 200 can implement each process implemented by the mobile terminal in the above method embodiments, and for avoiding repetition, details are not described here again.

The mobile terminal 200 of the present disclosure receives a first input by a user; displays a preset dialing control area in response to the first input; displays a pre-copied first phone number in the phone number input area of the dialing control area; receives a second input by the user on the dialing control area; and dials the first phone number in response to the second input. Therefore, when the mobile terminal displays any interface, the any interface can be displayed as the dialing control area, so that dialing is performed in the dialing control area, the operation is convenient, and the dialing efficiency can be improved.

Figures 1, 2, 3, 4, 5, 6, 7:
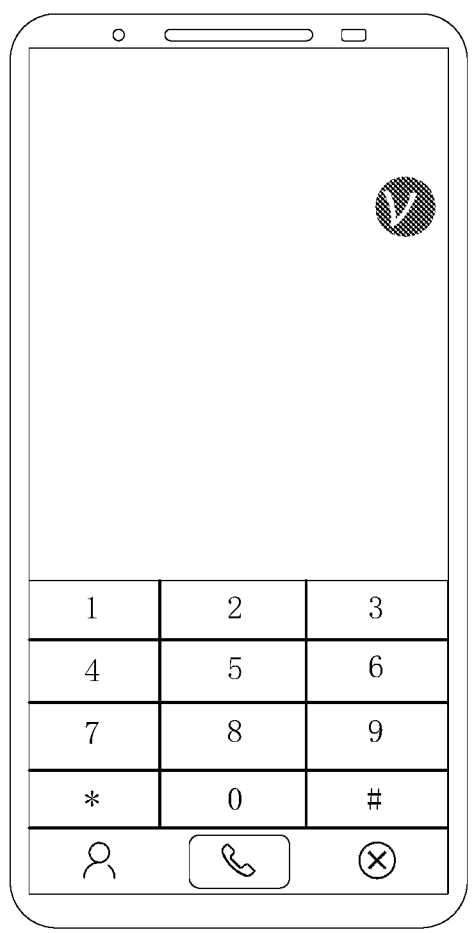
Figure 2:
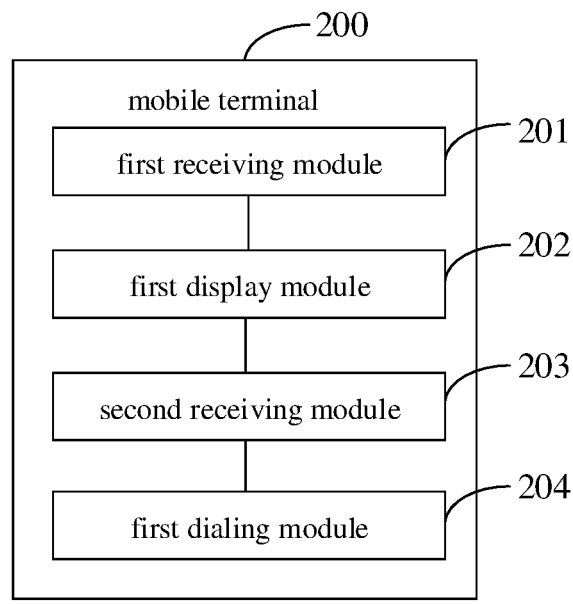
Figure 3:
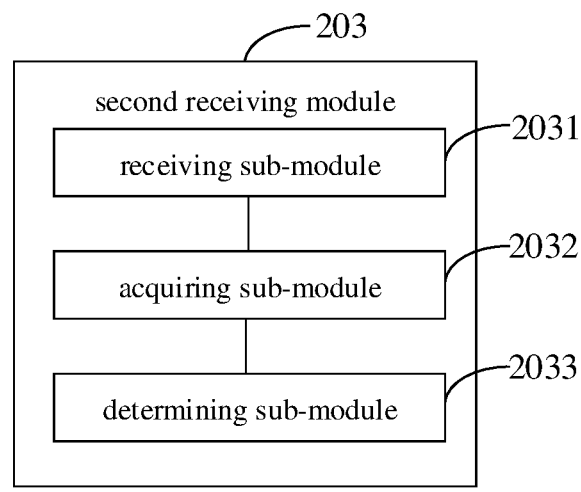
Figure 4:
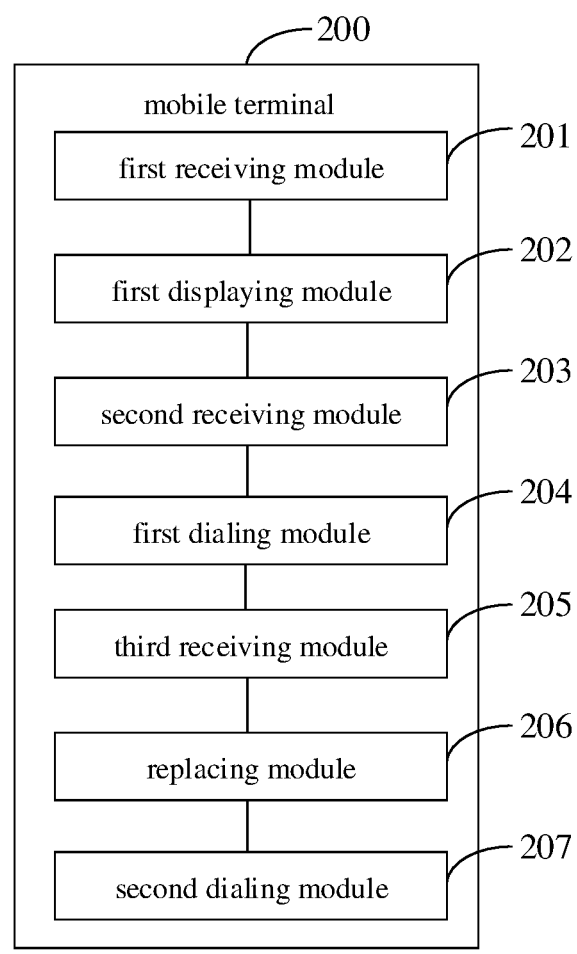
Figure 5:
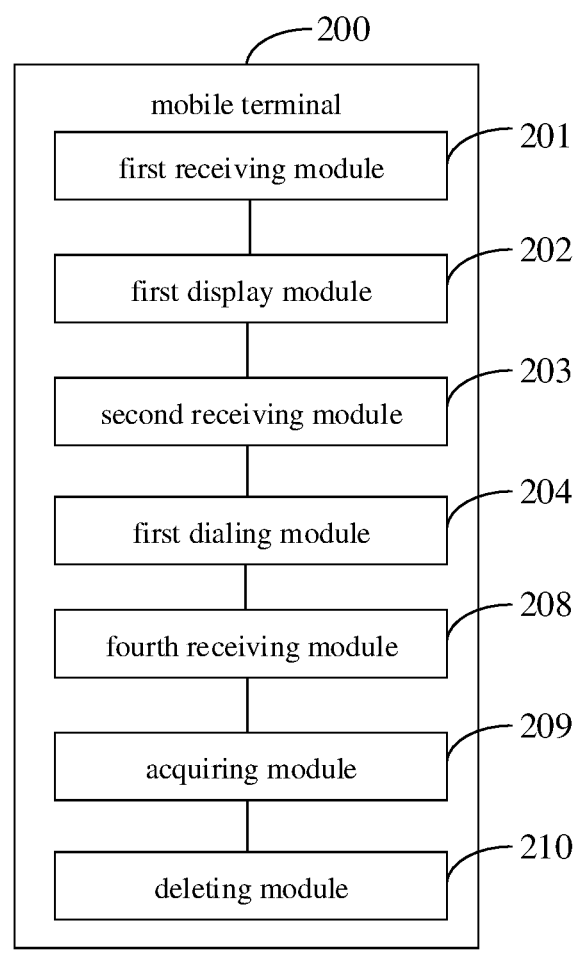
Figure 6:
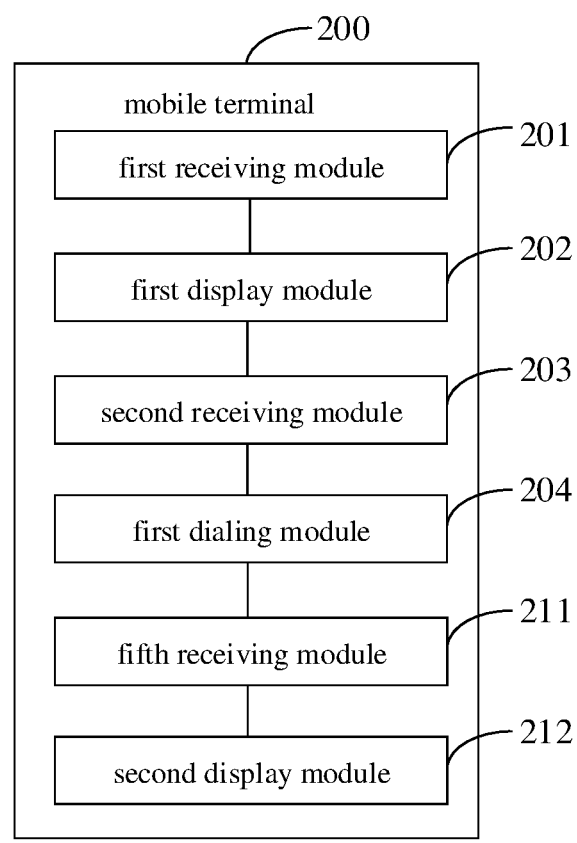
Figure 7:
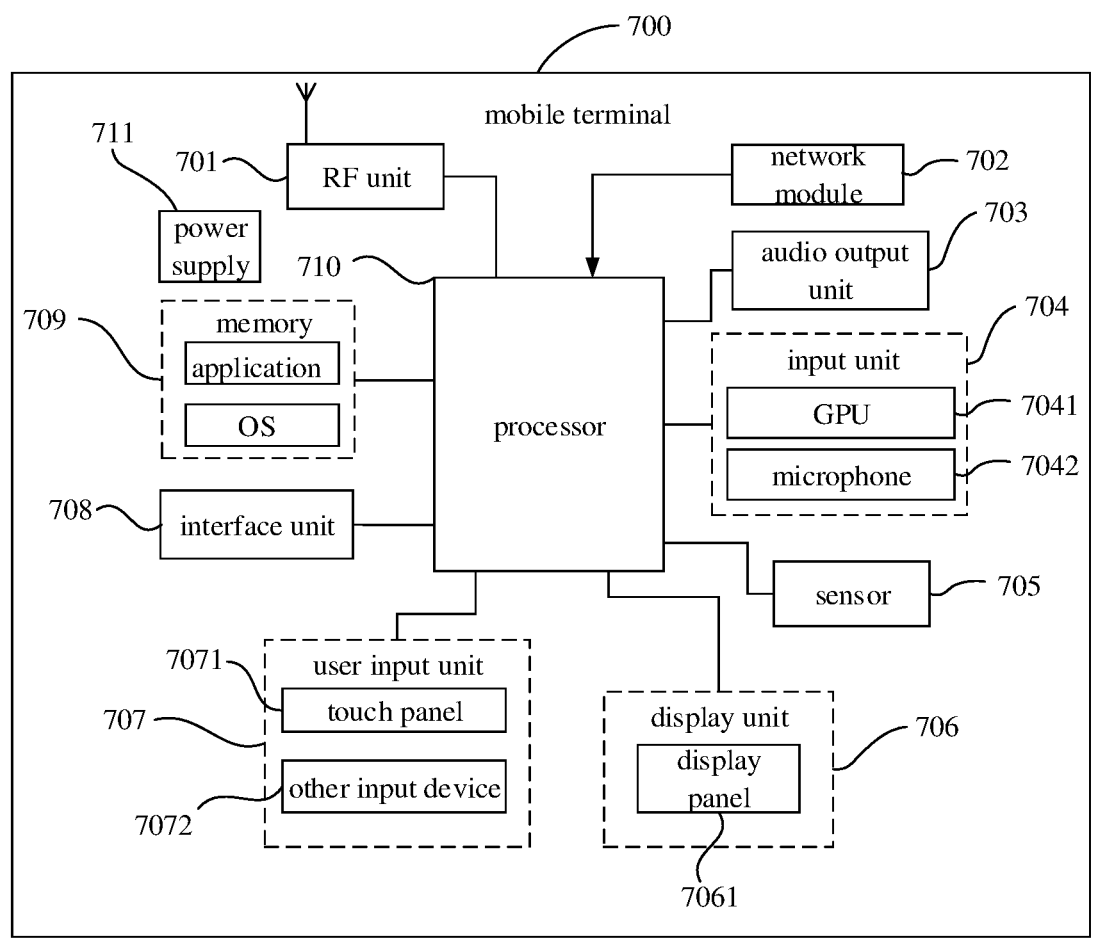

FIG. 7 is a schematic diagram of a hardware structure of a mobile terminal according to some embodiments of the present disclosure, the mobile terminal 700 includes, but is not limited to: a radio frequency (RF) unit 701, a network module 702, an audio output unit 703, an input unit 704, a sensor 705, a display unit 706, a user input unit 707, an interface unit 708, a memory 709, a processor 710, and a power supply 711. Those skilled in the art will appreciate that the mobile terminal illustrated in FIG. 7 is not intended to limit the mobile terminals, and the mobile terminal may include more or fewer components than those illustrated, or some of the components may be combined, or the components may be arranged differently. In the embodiment of the present disclosure, the mobile terminal includes, but is not limited to, a mobile phone, a tablet computer, a notebook computer, a palm computer, a vehicle-mounted mobile terminal, a wearable device, a pedometer, and the like.

The processor 710 is configured to receive a first input by a user; display a preset dialing control area in response to the first input, and display a pre-copied first phone number in a phone number input area of the dialing control area; receive a second input by the user on the dialing control area; dial the first phone number in response to the second input. Therefore, when the mobile terminal displays any interface, the interface can be displayed as a dialing control area, so that dialing is performed, operation is convenient, and dialing efficiency can be improved.

Optionally, the processor 710 is further configured to receive a first dragging input by the user on the first phone number in the currently displayed interface; and display a preset dialing control area in a case that a figure of the user performing the first dragging input are released, and display the first phone number in the phone number input area of the dialing control area.

Optionally, the processor 710 is further configured to receive a second dragging input by the user on the first preset identifier in the current display interface; and display a preset dialing control area in the case that a dragging end position of the second dragging input is in a preset area, and display a pre-copied first phone number in the phone number input area of the dialing control area.

Optionally, the processor 710 is further configured to receive a shaking input by the user to the mobile terminal; and when the times and the frequency of the shaking input are matched with a first preset shaking parameter, display a preset dialing control area, and display a pre-copied first phone number in the phone number input area of the dialing control area.

Optionally, the mobile terminal supports a first user identification card and a second user identification card; the processor 710 is further configured to receive a first sliding input by a user on the dialing control area; acquire a sliding direction of the first sliding input; determine a target user identification card in the first user identification card and the second user identification card based on the sliding direction; and dial the first phone number through the target user identification card.

Optionally, the dialing control area includes a second preset identifier; the processor 710 is further configured to receive a fourth input by the user on the second preset identifier; replace the first phone number in the phone number input area with a pre-copied second phone number in response to the fourth input; and dial the second phone number.

Optionally, the processor 710 is further configured to receive a second sliding input by the user on the number input area; acquire a sliding track of the second sliding input; and sequentially deleting at least one digit in the first phone number from the phone number input area based on the sliding track of the second sliding input.

Optionally, the processor 710 is further configured to receive a third input by the user; and display the dialing control area as a third preset identifier in response to the third input.

It should be appreciated that, in the embodiments of the present disclosure, the RF unit 701 is configured to transmit and receive signals during the information transmission or phone call. To be specific, the RF unit 701 may, upon the receipt of downlink data from a base station, transmit the downlink data to the processor 710 for subsequent treatment. In addition, the RF unit 701 may transmit uplink data to the base station. Usually, the RF unit 701 may include, but not limited to, an antenna, at least one amplifier, a transceiver, a coupler, a low-noise amplifier and a duplexer. In addition, the RF unit 701 may communicate with a network and the other devices via a wireless communication system.

The network module 702 is configured to enable the mobile terminal to access the broadband Internet in a wireless manner, e.g., help a user to receive and send an e-mail, browse a web page or access a streaming media.

The audio output unit 703 is configured to convert audio data received by the RF unit 701 or the network module 702, or audio data stored in the memory 709, into an audio signal and output the audio signal as a sound. In addition, the audio output unit 703 is further configured to provide an audio output related to a specific function executed by the mobile terminal 700 (e.g., a sound occurring when a calling signal or a message has been received). The audio output unit 703 may include a loudspeaker, a buzzer and a receiver.

The input unit 704 is configured to receive an audio or video signal. It may include a Graphics Processing Unit (GPU) 7041 and a microphone 7042. The GPU 7041 is configured to process image data of a static image or video acquired by an image collection unit (e.g., a camera) in a video capturing mode or an image capturing mode, and a processed image frame may be displayed by the display unit 706. The image frame processed by the GPU 7041 may be stored in the memory 709 (or any other storage medium) or transmitted via the RF unit 701 or network module 702. The microphone 7042 is configured to receive a sound, and convert the sound into voice data. In a call mode, the processed audio data may be converted into data in a format capable of being transmitted by the RF unit 701 to a mobile communication base station.

The at least one sensor 705 may include a light sensor, a movement sensor and the other sensors. To be specific, the light sensor may include an ambient light sensor or a proximity sensor. The ambient light sensor is configured to adjust a brightness value of a display panel 7061 in accordance with ambient light. The proximity sensor is configured to turn off the display panel 7061 and/or a backlight source when the mobile terminal 700 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the UE (e.g., perform a switching operation between portrait and landscape orientations, play relevant games, and calibrate a posture of a magnetometer), and perform vibration-related functions (e.g., count steps and strikes). The sensor 705 may further include a fingerprint sensor, a pressure sensor, an iris sensor, a molecule sensor, a gyroscope, a barometer, a hygrometer, a thermometer or an infrared sensor, which will not be particularly defined herein.

The display unit 706 is configured to display information inputted by the user or provided to the user. The display unit 706 may include the display panel 7061, e.g., a Liquid Crystal Display (LCD) panel, or an Organic Light-Emitting Diode (OLED) panel.

The user input unit 707 is configured to receive digital or character information inputted by the user, and generate a key signal input related to user settings and function control of the UE. To be specific, the user input unit 707 may include a touch panel 7071 and an input device 7072. The touch panel 7071, also called as touch screen, is configured to collect a touch operation made by the user on or in proximity to the touch panel (e.g., an operation made by the user through any appropriate object or attachment (e.g., finger or stylus) on or in the proximity to the touch panel 7071). The touch panel 7071 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 710, and receive and execute a command from the processor 710. In addition, the touch panel 7071 may be of a resistive type, a capacitive type, an infrared type or a surface acoustic wave (SAW) type. The other input device 7072 may include, but not limited to, a physical keyboard, a functional button (e.g., a volume control button or an on/off button), a trackball, a mouse, and a joystick, which will not be particularly defined herein.

Further, the touch panel 7071 may cover the display panel 7061. When the touch operation made on or in proximity to the touch panel 7071 has been detected, the touch panel 7071 may transmit the touch information to the processor 710, so as to determine a type of a touch event. Then, the processor 710 may control the display panel 7061 to provide a corresponding visual output in accordance with the type of the touch event. Although the touch panel 7071 and the display panel 7061 are configured as two separate members in FIG. 7, in some embodiments of the present disclosure, they may be integrated so as to achieve the input and output functions of the electronic device, which will not be particularly defined herein.

The interface unit 708 is configured to provide an interface between an external device and the mobile terminal 700. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 708 is configured to receive an input from the external device (e.g., data information and electricity) and transmit the input to one or more elements of the mobile terminal 700, or transmit data between the mobile terminal 700 and the external device.

The memory 709 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 709 may include a high-speed random access memory (RAM), or a non-volatile memory (e.g., at least one magnetic disk or flash memory), or any other volatile solid state memory.

As a control center of the electronic device, the processor 710 may be connected to the other members of the electronic device via various interfaces and circuits, and configured to run or execute the software program and/or module stored in the memory 709, and call the data stored in the memory 709, so as to execute the functions of the electronic device and process the data, thereby to monitor the entire electronic device. The processor 710 may include one or more processing units. In a possible embodiment of the present disclosure, an application processor and a modem may be integrated into the processor 710. The application processor is mainly configured to process the operating system, a user interface and the application. The modem is mainly configured to process wireless communication. It should be appreciated that, the modem may also not be integrated into the processor 710.

The power source 711 (e.g., a battery) is configured to supply power to the members of the mobile terminal 700. In a possible embodiment of the present disclosure, the power source 711 is logically connected to the processor 710 via a power source management system, so as to achieve such functions as charging, discharging and power consumption management through the power source management system.

In addition, the mobile terminal 700 may include some functional modules not shown, which will not be particularly defined herein.

The present disclosure further provides in some embodiments a mobile terminal, which includes a processor 710, a memory 709, and a computer program stored in the memory 709 and executed by the processor 710 to implement the above dialing method, a same technical effect is achieved. In order to avoid repetition, it is not described herein.

The present disclosure further provides in some embodiments a computer-readable storage medium storing therein a computer program. The computer program is executed by a processor so as to implement the above-mentioned dialing method with a same technical effect, which will not be particularly defined herein. The computer-readable storage medium may be an ROM, an RAM, a magnetic disk or an optical disk.

It should be noted that in this disclosure, the terms "comprise", "include" or any other variant thereof are intended to cover non-exclusive inclusion, so that a process, method, article or device that includes a series of elements includes not only those elements, but also other elements that are not explicitly listed, or include elements inherent to such processes, methods, objects, or devices. Without more restrictions, the element defined by the sentence "include a . . . " does not exclude that there are other identical elements in the process, method, article or device that includes the element.

Through the description of the above embodiments, those skilled in the art can clearly understand that the methods in the above embodiments can be implemented by means of software plus a necessary general hardware platform, and of course, can also be implemented by hardware, but in many cases the former is better. Based on such an understanding, the technical solutions of the present disclosure can essentially be embodied in the form of software products that contribute to related art, and the computer software products are stored in a storage medium (such as ROM/RAM, magnetic disk, or optical disk)), including several instructions to enable a mobile terminal (which may be a mobile phone, computer, server, air conditioner, or network device, etc.) to perform the methods described in various embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A dialing method applied to a mobile terminal, comprising:
   receiving a first input by a user;
   displaying a preset dialing control area in response to the first input, and displaying a pre-copied first phone number in a phone number input area of the dialing control area;
   receiving a second input by the user on the dialing control area; and
   dialing the first phone number in response to the second input,
   wherein the dialing control area comprises a second preset identifier;
   after the dialing the first phone number, the method further comprises:
   receiving a fourth input by the user on the second preset identifier;
   replacing the first phone number in the phone number input area with a pre-copied second phone number in response to the fourth input; and
   dialing the second phone number.

2. The dialing method according to claim 1, wherein the receiving a first input by a user comprises:
   receiving a first dragging input by the user on the first phone number in a current display interface;
   the displaying a preset dialing control area in response to the first input, and displaying a pre-copied first phone number in a phone number input area of the dialing control area comprises:
   displaying the preset dialing control area when a finger of the user performing the first dragging input is released, and displaying the first phone number in the phone number input area of the dialing control area.

3. The dialing method according to claim 1, wherein the receiving a first input by a user comprises:
   receiving a second dragging input by a user on a first preset identifier in a current display interface;
   the displaying a preset dialing control area in response to the first input, and displaying a pre-copied first phone number in a phone number input area of the dialing control area comprises:
   displaying the preset dialing control area when a dragging end position of the second dragging input is in a preset area, and displaying the pre-copied first phone number in the phone number input area of the dialing control area.

4. The dialing method according to claim 1, wherein the receiving a first input by a user comprises:
   receiving a shaking input by the user to the mobile terminal;
   the displaying a preset dialing control area in response to the first input, and displaying a pre-copied first phone number in a phone number input area of the dialing control area comprises:
   when times and frequency of the shaking input are matched with a first preset shaking parameter, displaying the preset dialing control area, and displaying the pre-copied first phone number in the phone number input area of the dialing control area.

5. The dialing method according to claim 1, wherein the mobile terminal supports a first user identification card and a second user identification card;
   the receiving a second input by the user on the dialing control area comprises:
   receiving a first sliding input by the user on the dialing control area;
   acquiring a sliding direction of the first sliding input;
   determining a target user identification card in the first user identification card and the second user identification card based on the sliding direction;
   the dialing the first phone number comprises:
   dialing the first phone number through the target user identification card.

6. The dialing method according to claim 1, wherein, after the displaying a preset dialing control area in response to the first input, and displaying a pre-copied first phone number in a phone number input area of the dialing control area, the dialing method further comprises:
- receiving a second sliding input by the user on the phone number input area;
- acquiring a sliding track of the second sliding input; and
- sequentially deleting at least one digit in the first phone number from the phone number input area based on the sliding track of the second sliding input.

7. The dialing method according to claim 1, wherein, after dialing the first phone number in response to the second input, the dialing method further comprises:
- receiving a third input by the user; and
- displaying the dialing control area as a third preset identifier in response to the third input.

8. A mobile terminal, comprising: a memory, a processor and computer program stored on the memory and executed by the processor, so as to implement the dialing method according to claim 1.

9. The mobile terminal according to claim 8, wherein the receiving a first input by a user comprises:
- receiving a first dragging input by the user on the first phone number in a current display interface;
- the displaying a preset dialing control area in response to the first input, and displaying a pre-copied first phone number in a phone number input area of the dialing control area comprises:
- displaying the preset dialing control area when a finger of the user performing the first dragging input is released, and displaying the first phone number in the phone number input area of the dialing control area.

10. The mobile terminal according to claim 8, wherein the receiving a first input by a user comprises:
- receiving a second dragging input by a user on a first preset identifier in a current display interface;
- the displaying a preset dialing control area in response to the first input, and displaying a pre-copied first phone number in a phone number input area of the dialing control area comprises:
- displaying the preset dialing control area when a dragging end position of the second dragging input is in a preset area, and displaying the pre-copied first phone number in the phone number input area of the dialing control area.

11. The mobile terminal according to claim 8, wherein the receiving a first input by a user comprises:
- receiving a shaking input by the user to the mobile terminal;
- the displaying a preset dialing control area in response to the first input, and displaying a pre-copied first phone number in a phone number input area of the dialing control area comprises:
- when times and frequency of the shaking input are matched with a first preset shaking parameter, displaying the preset dialing control area, and displaying the pre-copied first phone number in the phone number input area of the dialing control area.

12. The mobile terminal according to claim 8, wherein the mobile terminal supports a first user identification card and a second user identification card;
- the receiving a second input by the user on the dialing control area comprises:
- receiving a first sliding input by the user on the dialing control area;
- acquiring a sliding direction of the first sliding input;
- determining a target user identification card in the first user identification card and the second user identification card based on the sliding direction;
- the dialing the first phone number comprises:
- dialing the first phone number through the target user identification card.

13. The mobile terminal according to claim 8, wherein, after the displaying a preset dialing control area in response to the first input, and displaying a pre-copied first phone number in a phone number input area of the dialing control area, the dialing method further comprises:
- receiving a second sliding input by the user on the phone number input area;
- acquiring a sliding track of the second sliding input; and
- sequentially deleting at least one digit in the first phone number from the phone number input area based on the sliding track of the second sliding input.

14. The mobile terminal according to claim 8, wherein, after dialing the first phone number in response to the second input, the dialing method further comprises:
- receiving a third input by the user; and
- displaying the dialing control area as a third preset identifier in response to the third input.

15. A non-transitory computer-readable storage medium storing a computer program therein, when the computer program is executed by a processor to implement the dialing method according to claim 1.

* * * * *